3,732,184
EMULSION POLYMERIZATION METHOD
Martin K. Lindemann and Donald M. Wacome, Greenville, S.C., assignors to Chas. S. Tanner Co., Greenville, S.C.
No Drawing. Filed Apr. 22, 1971, Ser. No. 136,532
Int. Cl. C08g 22/04
U.S. Cl. 260—77.5 BB          23 Claims

ABSTRACT OF THE DISCLOSURE

Polymer latices containing thermosetting polymers and which have the capacity to cure to greater insolubility are provided by a two stage emulsion polymerization method. The polymerization is an aqueous emulsion polymerization using a redox catalyst system in which from 35–70% of the total monomers are polymerized in the first stage, with the product being cooled prior to the introduction of the balance of the monomers.

---

The present invention relates to polymer latices containing thermosetting polymers and which have the capacity when cured to become more fully insolubilized.

Polymer latices are conventionally used as adhesives or in pastes for the dyeing and printing of textiles, it being intended to bake the product after use so as to eliminate the tackiness of the polymer used. In order that the polymer employed in the emulsion might be used for its intended purpose, it is necessary that the polymer have a low glass transition temperature ($T_g$) and considerable adhesive quality. On the other hand, after application, it is desired to remove the adhesive characteristic by curing, and the more completely the adhesive characteristic is eliminated, the better the final product. Thus, a proper cure should eliminate tackiness at elevated temperature and should provide a reasonable degree of solvent resistance.

The present invention is based on the finding that the extent of insolubilization of the polymer and its blocking temperature are governed in significant part by the manner in which the original emulsion polymer is prepared.

In this invention, monoethylenic monomers, and especially those containing alpha,beta-ethylenic unsaturation, are polymerized in aqueous emulsion using a redox polymerization system, with the polymerization being conducted in two distinct stages. In the first stage 35–70% of the monomers (preferably 45–70%) are added and the polymerization is carried out until the exotherm subsides. The product of this first polymerization stage is then cooled to make the second polymerization stage more manageable, and the balance of the monomers are then added (either all at once or in several additions) and additional catalyst is added (usually just reducing agent) to cause polymerization to recommence generating at least one additional exotherm and the polymerization is then completed in customary fashion. The monoethylenic monomers must include reactive monomers capable of thermosetting cure.

Apparently, the multi-stage polymerization of this invention (usually two stages) enables a soluble linear polymer structure to be prepared in a more uniform and somewhat higher molecular weight. When this is achieved with a thermosetting copolymer structure and the polymer product is cured, a greater proportion of the polymer is rendered insoluble, the blocking temperature is elevated, and the tackiness of the cured product is reduced or eliminated, even at elevated temperature. When these polymers are employed as an adhesive to anchor flock to a substrate, the flock is more securely bonded and better resists being pulled out of the fabric and better withstands wet abrasion. When applied to fabrics as the binder in a printing paste, the dyed fabrics demonstrate superior resistance to dry cleaning and exhibit other superior characteristics, especially improved tensile strength in a direction transverse to the direction of fabric production.

The emulsion copolymerization in the invention is a conventional polymerization which may be carried out in the presence or absence of emulsifying agents which may be anionic, cationic, or nonionic, the nonionic type being preferred ether alone or in admixture with an ionic emulsifying agent. These are commonly used in an amount of 0.1–6%, based on the weight of total monomers.

The aqueous emulsion which is polymerized will include an effective amount of a suitable free radical generating polymerization initiator which is activated by an oxidation-reduction (redox) reaction. These systems are well known and are illustrated by combinations such as cumene hydroperoxide-sodium metabisulfite, diisopropylbenzene hydroperoxide-sodium formaldehyde sulfoxylate, tertiary butyl peracetate-sodium hydrosulfite, cumene hydroperoxide-sodium formaldehyde sulfoxylate, etc. It is frequently desired that a portion of the polymer be constituted by one or more monomers which are quite water soluble, such as acrylonitrile, which is 8% soluble at room temperature, N-methylol acrylamide, which is even more soluble. Here, initiator-including systems may be water soluble, as for example, sodium or potassium persulfate-sodium formaldehyde sulfoxylate, and the like.

The monomers which are copolymerized in accordance with the invention are monoethylenic monomers which may be water soluble or insoluble, but which are preferably a mixture of both types of monomers. Acrylate and methacrylate esters are particularly contemplated such as ethyl acrylate, butyl acrylate, isobutyl acrylate, 2-ethylhexyl acrylate and butyl methacrylate, these being water insoluble. The esters referred to above may also be characterized as being of the type which lower the $T_g$ of the copolymer, but monomers which tend to increase the $T_g$ are usually used in combination with those which lower the $T_g$, these monomers which elevate the $T_g$ being illustrated by acrylonitrile and methyl methacrylate. Acrylonitrile is a particularly desirable component of the copolymers contemplated by this invention, and it is water soluble. Other diverse types of monomers which may be used are illustrated by vinyl chloride, vinylidene chloride, styrene, vinyl toluene, vinyl acetate and the like.

It is particularly preferred that the various monomers which are copolymerized in accordance with this invention have copolymerization reactivity ratios which are approximately comparable with one another so as to force a uniform distribution of monomers within the copolymers structure. For example, N-methylol allyl carbamate may be used advantageously in a vinyl acetate or vinyl chloride copolymerization system; N-methylol acrylamide in an acrylic ester ($C_1$–$C_8$ alkyl esters) or styrene copolymerization system; and N-methylol methacrylamide in a $C_1$–$C_8$ alkyl methacrylate copolymerization system.

The monomers which carry reactive groups enabling the copolymer to be thermosetting per se are particularly illustrated by monoethylenic monomers which carry the N-methylol group, such as acrylamide or methacrylamide or other monoethylenic carboxylic acid amide. It is particularly desirable to use these N-methylol amide compounds in combination with monomers carrying the amide group such as acrylamide or methacrylamide or monomers carrying the hydroxy group such as hydroxy ethyl acrylate or hydroxy ethyl methacrylate. It is also desirable to include a small proportion, up to about 3% but more usually 0.1–1.0%, of an acidic monomer, desirably a monoethylenic carboxylic acid such as acrylic acid, methacrylic acid, crotonic acid, or itaconic acid.

While the selection of monoethylenic monomers and their proportioning are subject to wide variation in accordance with this invention, one of the primary polymer attributes which dictates monomer selection and proportion is the glass transition temperature ($T_g$) of the copolymer. This polymer characteristic is well known and is determined herein by a method described in Applied Polymer Symposia, vol. 10, page 73, 1969. The polymers preferably contemplated in this invention have a $T_g$ below 40° C. and more preferably have a $T_g$ below 0° C. To illustrate the range of the invention, polymer systems having a $T_g$ of −66° C. have been found to be benefitted in this invention by an increase of insoluble component from 67.6% to 84.6%. In this connection, and while it is not unusual for the method of this invention to produce polymers exhibiting an increased intrinsic viscosity, such increase in intrinsic viscosity is not always obtained in this invention and is not needed in this invention. Indeed, the polymer system having a $T_g$ of −66° C., and which exhibited a marked increase in insoluble component experienced a decrease in intrinsic viscosity from 0.64 to 0.48 at the same time that the insoluble fraction thereof was increased.

While the preferred monomers providing thermosetting characteristics are N-methylol amides, any monoethylenic monomer providing the N-methylol group may be used. Moreover, and less desirably, other reactive monoethylenic monomers, such as glycidyl methacrylate, in combination with monoethylenic carboxylic acids, may be relied upon to provide a system which will be caused to become more insoluble in organic solvents when subsequently baked.

The baking temperatures in the invention may vary from about 250° F. to about 500° F. for various periods of time, ranging from 30 seconds at the highest temperature to about an hour at the lowest. The proportion of reactive monomer providing the thermosetting characteristics may also vary considerably, depending upon the extent of cross-linking which is desired in the final bake. While this may broadly range from 0.5 to 15%, based on total monomers, it is preferred to employ proportions of from 1–5% on the same basis. In normal practice, the total of all of the reactive monomers, methylol acrylamide, acrylamide, and carboxylic acid will be about 5%, based on total monomers, and the proportion of methylol acrylamide which is the monomer providing thermosetting characteristics will be about 2% on the same basis.

The invention is illustrated in the examples which follow.

EXAMPLE 1

Production of methylol acrylamide aqueous solution 1817 pounds of water, 328 pounds of acrylamide and 170.5 pounds of a 37% aqueous formaldehyde solution containing 1–2% methanol are charged to a reactor and 325 milliliters of 50% sodium hydroxide are added to adjust the pH into the range of 10.2–10.5. The batch is heated slowly to about 80° F. and then the heat is shut off as the reaction proceeds. Cooling is used as needed to prevent the temperature from exceeding 115° F. After the exotherm has subsided, the temperature is maintained in the range of 85–100° F. for one hour whereupon concentrated sulfuric acid is added to adjust the pH to 6.0 (the pH may vary from 5.7 to 6.2). Then the product is cooled below 85° F. and stored.

As will be clear from the proportions used, there is less formaldehyde present than is required to methylolate one-half of the acrylamide used so the product is a mixture of methylol acrylamide and unreacted acrylamide.

EXAMPLE 2

Production of aqueous emulsion 3502 pounds of the mixture of methylol acrylamide and acrylamide in water solution produced in Example 1 (solids content 16.9%) are mixed with agitation with 766 pounds of a nonionic emulsifying agent (an ethylene oxide adduct with octyl phenol containing 40 moles of ethylene oxide per mole of octyl phenol), 57.75 pounds of itaconic acid, a solution of 35.5 pounds of diammonium phosphate in 109 pounds of water, 2296 pounds of acrylonitrile, and 9183 pounds of butyl acrylate. This provides an emulsion of monomers to which are added 9947 pounds of water and 96.5 pounds of the above identified nonionic emulsifying agent. One-half of this premixed emulsion is then pumped into a reactor and there is further added to the reactor 60 pounds of sodium persulfate and 45 grams of ferrous sulfate. The contents of the reactor are then mixed for 5 minutes whereupon 45 pounds of a reducing solution (a solution of five pounds sodium formaldehyde sulfoxylate in 40 pounds of water) are added to initiate polymerization. The temperature in the reactor rises to about 182° F. and then begins to subside. After the exotherm is over and the temperature begins to drop, the reactor is cooled to 100° F. to insure that the second exotherm will not be excessive. The remainder of the premixed emulsion is then added to the reactor together with 63 gallons of wash water and the contents of the reactor are agitated for 5 minutes whereupon an additional 45 pounds of reducing solution (5 pounds of sodium formaldehyde sulfoxylate dissolved in 40 pounds of water) are added and a second exotherm takes place causing the temperature to rise to about 160° F. The reactor contents are then cooled below 120° F. and 35.5 pounds of diammonium phosphate in 109 pounds of water are added. The product is then cooled to below 100° F. and stored.

The polymer produced as described above has a $T_g$ of −20° C., and an intrinsic viscosity of 2.56 (meausred in dimethyl formamide at 30° C.). In measuring viscosity, a sample of the polymer emulsion (0.5 cc.) is added to 100 cc. of reagent grade dimethyl formamide and the mixture agitated for 20 minutes and filtered. The flow time of the solution so-prepared is then compared with the flow time of the pure esolvent using a Ubbelohde Viscosimeter (Cannon-Fenske) at 30° C. The relative viscosity is the fraction obtained by dividing the flow time of the solution by the flow time of the pure solvent. The Huggin's equation is then used to calculate the intrinsic viscosity from the relative viscosity measurement and from the resin solids content in grams per 100 ml. of emulsion.

When a specimen is baked at 110° C. for five minutes and then extracted with perchlorethylene, 98.4% of the cured resin was insoluble. The percent insoluble value is obtained by pouring 25 ml. of the polymer emulsion on a glass plate, and allowing it to dry overnight at room temperature. Water is then removed by 24 hours storage in a desiccator. The dry film is then scraped off the glass plate and 4 grams thereof are placed in a Soxhlet thimble. Extraction is then carried out with 350 ml. of perchlorethylene at boiling for 48 hours. The solvent is then evaporated and the residue is dried overnight at 95° C. in a forced air oven. The weight of the polymer sample after extraction is compared with the weight of the sample before extraction to provide the percent insoluble value.

When the same monomers are polymerized in a conventional single stage redox polymerization, the polymer product exhibits the same $T_g$ of −20° C. However, the intrinsic viscosity is somewhat lower (1.99) as compared to 2.56 and, after baking and extraction as described above, the percent insolubles is considerably lower, e.g., 77.6% as compared with 98.4%.

If desired a small proportion of vinyl acetate may be added, together with additional catalysts to insure completion of polymerization in the aqueous phase, but this is not normally needed. However, the addition of vinyl acetate is illustrated by the addition of 113 pounds of vinyl acetate as soon as the second exotherm begins to subside. The vinyl acetate is added together with 1 pound of sodium formaldehyde sulfoxylate dissolved in 1 gallon of water and 2000 cc. of tertiary butyl hydroperoxide (70% active in water).

It will be appreciated that the emulsions of the invention may be used clear or pigmented as desired, pigmentation being wholly conventional and forming no part of this invention. Similarly, additives may be added to the emulsion for all sorts of purposes, these again being conventional and forming no part of this invention.

The invention is defined in the claims which follow.

We claim:

1. A method of copolymerizing monoethylenic unsaturated monomers including reactive monoethylenic monomers providing thermosetting characteristics in a manner providing a polymer product which becomes more fully insolubilized when cured comprising, forming an aqueous emulsion containing from 35–70% of the total monomers emulsified in water, adding to said emulsion a redox catalyst system to cause said monomers to polymerize generating a first exotherm in a first stage of polymerization, cooling the emulsion so-obtained to accommodate another exotherm, adding the balance of the monomers to the cooled emulsion in one or more stages to form a mixture of emulsified monomers and polymers, and causing polymerization to recommence thereby generating at least one additional exotherm.

2. A method as recited in claim 1 in which said monomers are alpha,beta-ethylenic monomers.

3. A method as recited in claim 1 in which said reactive monoethylenic monomers include the N-methylol group.

4. A method as recited in claim 3 in which said monomers further include monomer carrying the amide group.

5. A method as recited in claim 3 in which said monomers further include monomer carrying the carboxylic acid group.

6. A method as recited in claim 1 in which said monomers include acrylate or methacrylate esters in admixture with acrylonitrile.

7. A method as recited in claim 1 in which the polymer has a $T_g$ below 40° C.

8. A method as recited in claim 6 in which the polymer has a $T_g$ below 0° C.

9. A method as recited in claim 1 in which 45–70% of the monomers are added in the said first stage of the polymerization.

10. A method as recited in claim 9 in which the balance of the monomers are added in a second stage.

11. A method as recited in claim 10 in which the monomers are added in each of said first and second stages together with nonionic emulsifying agent.

12. A method as recited in claim 1 in which said redox catalyst system is water soluble.

13. A method as recited in claim 12 in which said redox catalyst system comprises alkali metal persulfate.

14. A method as recited in claim 13 in which said redox catalyst system further comprises sodium formaldehyde sulfoxylate.

15. A method as recited in claim 1 in which the monomers include N-methylol acrylamide.

16. A method as recited in claim 15 in which the monomers further include acrylamide.

17. A method as recited in claim 1 in which said reactive monoethylenic monomer is present in an amount of from 0.5–15%, based on total monomers.

18. A method as recited in claim 17 in which said reactive monoethylenic monomer is present in an amount of from 1–5%, based on total monomers.

19. A method as recited in claim 1 in which said monomers all have copolymerization reactivity ratios which are approximately comparable with one another.

20. A method as recited in claim 1 in which said monomers comprise either vinyl acetate or vinyl chloride in admixture with N-methylol allyl carbamate.

21. A method as recited in claim 1 in which said monomers comprise $C_1$–$C_8$ alkyl acrylate and N-methylolacrylamide.

22. A method as recited in claim 1 in which said monomers comprise $C_1$–$C_8$ alkyl methacrylate and N-methylol methacrylamide.

23. The product of the method of claim 1.

References Cited
UNITED STATES PATENTS

| | | | |
|---|---|---|---|
| 2,475,016 | 7/1949 | De Nié | 260—8.7 G |
| 2,537,334 | 1/1951 | De Nié | 260—88.7 G |
| 2,556,437 | 6/1951 | Mowry et al. | 260—77.5 BB |
| 2,570,056 | 10/1951 | Halbig | 260—88.7 G |
| 3,326,868 | 6/1967 | Tucker | 260—86.1 N |
| 3,485,811 | 12/1969 | Levine et al. | 260—86.1 N |

DONALD E. CZAJA, Primary Examiner

M. J. WELSH, Assistant Examiner

U.S. Cl. X.R.

260—80.75, 85.5 P, 86.1 N, 88.7 G